(12) United States Patent
Hama (10) Patent No.: US 8,135,983 B2
(45) Date of Patent: Mar. 13, 2012

(54) INFORMATION PROCESSING APPARATUS, CONTROL METHOD OF THE INFORMATION PROCESSING APPARATUS, AND RECORDING MEDIUM

(75) Inventor: Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/837,865

(22) Filed: Jul. 16, 2010

(65) Prior Publication Data

US 2011/0022888 A1 Jan. 27, 2011

(30) Foreign Application Priority Data

Jul. 23, 2009 (JP) ................... 2009-172069

(51) Int. Cl.
*G06F 11/00* (2006.01)
(52) U.S. Cl. ...................... 714/6.23; 714/6.32
(58) Field of Classification Search .................. 714/6.23
See application file for complete search history.

(56) References Cited

U.S. PATENT DOCUMENTS

| | | | | |
|---|---|---|---|---|
| 5,619,723 A * | 4/1997 | Jones et al. | ...... | 710/3 |
| 5,802,264 A * | 9/1998 | Chen et al. | ...... | 714/6.12 |
| 6,647,514 B1 * | 11/2003 | Umberger et al. | ...... | 714/42 |
| 7,055,058 B2 * | 5/2006 | Lee et al. | ...... | 714/6.32 |
| 7,890,741 B2 * | 2/2011 | Du et al. | ...... | 713/1 |
| 2004/0181656 A1 * | 9/2004 | Stern et al. | ...... | 713/1 |
| 2007/0088976 A1 | 4/2007 | Daikokuya | | |
| 2007/0101187 A1 | 5/2007 | Daikokuya | | |
| 2007/0168706 A1 * | 7/2007 | Humlicek | ...... | 714/6 |
| 2008/0082814 A1 * | 4/2008 | Kuo et al. | ...... | 713/2 |
| 2008/0082815 A1 * | 4/2008 | Kawano et al. | ...... | 713/2 |
| 2008/0195852 A1 * | 8/2008 | Cromer et al. | ...... | 713/1 |
| 2010/0169631 A1 * | 7/2010 | Yao et al. | ...... | 713/2 |

FOREIGN PATENT DOCUMENTS

JP 2007-094994 A 4/2007

* cited by examiner

*Primary Examiner* — Robert Beausoliel, Jr.
*Assistant Examiner* — Neil Miles
(74) *Attorney, Agent, or Firm* — Canon USA, Inc. IP Division (57) ABSTRACT

An information processing apparatus connecting a plurality of hard disks rebuilds data stored in one hard disk of the plurality of hard disks to another hard disk of the plurality of hard disks. The information processing apparatus is controlled in such a manner that when the information processing started, the rebuild is not resumed immediately after the information processing apparatus is started, and the rebuild is resumed after a predetermined time has elapsed.

9 Claims, 8 Drawing Sheets

INFORMATION TO BE STORED IN FLASH MEMORY

| ADDRESS | SIZE | CONTENT |
|---|---|---|
| 0000h~0003h | 4Byte | REBUILD DELAY TIME (SEC), REBUILD IS DELAYED FOR THIS TIME |
| 0004h~0007h | 4Byte | PATROL DELAY TIME (SEC), PATROL IS DELAYED FOR THIS TIME |
| 0008h~000Bh | 4Byte | RESERVED |
| 000Ch~000Fh | 4Byte | RESERVED |
| 0010h~0017h | 8Byte | REBUILD-COMPLETED SECTOR |
| 0018h~000Fh | 8Byte | PATROL-COMPLETED SECTOR |

FIG. 4

| EXTENDED COMMAND LIST | TYPE OF ATA |
|---|---|
| SETUP REBUILD | PioOut |
| SETUP PATROL | PioOut |
| TO SLEEP | NonData |
| CHANGE MODE | PioOut |
| WAKEUP | NonData |

FIG. 5

DATA TO BE SENT BY SETUP REBUILD COMMAND

| ADDRESS | SIZE | CONTENT |
|---|---|---|
| 0000h~0003h | 4Byte | REBUILD DELAY TIME (SEC), REBUILD IS DELAYED FOR THIS TIME |
| 0004h~0007h | 4Byte | WHETHER OR NOT TO PERFORM AUTOMATIC REBUILD (0: YES WHEN HDD IS CHANGED; 1: NO) |
| 0008h~000Bh | 4Byte | WHETHER OR NOT TO VERIFY IN REBUILD |
| 000Ch~000Fh | 4Byte | REBUILD RANGE (0: HDD ENTIRE RANGE, 1: AREA A) |
| 0010h~0017h | 8Byte | FIRST SECTOR OF AREA A |
| 0018h~000Fh | 8Byte | SIZE OF AREA A |

FIG. 6

DATA TO BE SENT BY SETUP PATROL COMMAND

| ADDRESS | SIZE | CONTENT |
|---|---|---|
| 0000h~0003h | 4Byte | PATROL DELAY TIME (SEC), PATROL IS DELAYED FOR THIS TIME |
| 0004h~0007h | 4Byte | PATROL START CONDITIONS (0: AUTOMATIC START INVALID; 1-100: PATROL IS ACTIVATED AT EVERY SPECIFIED NUMBER OF STARTUPS) |
| 0008h~000Bh | 4Byte | PATROL RANGE (0: HDD ENTIRE RANGE; 1: AREA A) |
| 000Ch~000Fh | 4Byte | RESERVED |
| 0010h~0017h | 8Byte | FIRST SECTOR OF AREA A |
| 0018h~000Fh | 8Byte | SIZE OF AREA A |

FIG. 7

DATA TO BE SET BY CHANGE MODE COMMAND

| ADDRESS | SIZE | CONTENT |
|---|---|---|
| 0000h~0003h | 4Byte | MODE SWITCHOVER (0: SINGLE MODE; 1: MIRRORING MODE) |
| | | ADDRESSES LISTED BELOW ARE RESERVED |
| | | |
| | | |

INFORMATION PROCESSING APPARATUS, CONTROL METHOD OF THE INFORMATION PROCESSING APPARATUS, AND RECORDING MEDIUM

BACKGROUND OF THE INVENTION

1. Field of the Invention

The present invention relates to an information processing apparatus including a plurality of hard disks, a control method of the information processing apparatus, and a recording medium.

2. Description of the Related Art

As a measure for a failure of hard disks, a mirroring technique is known, which records identical data in a plurality of local hard disks. When mirroring is implemented, even if a failure occurs in a hard disk, an ongoing processing can be continued by using another hard disk, which improves reliability.

A mirroring system, which performs mirroring, is provided with a function to rebuild (build again) data. Rebuild is a function to recover data of a failed hard disk (HDD) from a remaining trouble-free HDD when a failure occurs in one of two HDDs. For example, rebuild is performed to achieve consistency between the operating HDD and a HDD mounted to replace the failed HDD.

The mirroring system further includes a so-called patrol function configured to correct errors by reading all sectors of the two HDDs and rewriting the sectors of the error-detected HDD by data from the other HDD.

In the mirroring system provided with the functions described above, generally, while power to a host computer is discontinued or the host computer enters a sleep mode, power supply to the mirroring system is stopped and goes into a power-off state. When the power supply to the mirroring system turns off while the mirroring system is executing rebuild processing, information as to how far a rebuild processing has been executed is recorded in a non-volatile memory in the mirroring system.

When the host computer is restarted or returns from the sleep mode, the mirroring system automatically resumes the rebuild processing, which has been interrupted, according to information stored in the non-volatile memory.

Rebuild (or patrol) processing is usually executed for each predetermined number of blocks. When a HDD read/write request is sent from the host computer connected to the mirroring system during a rebuild processing, HDD read/write operations requested by the host computer are executed in time slots between blocks of rebuild processing.

Therefore, if the blocks of the rebuild processing are divided in large size units, there is a problem that the response to requests from the host computer will be slower.

To solve this problem, Japanese Patent Application Laid-Open No. 2007-94994 discusses a technique in which when HDD access requests frequently come from a host computer, by recasting the blocks of rebuild processing into smaller units, the response to HDD access requests from the host computer can be made quicker.

By using the technique described above, the response to HDD access requests from the host computer can be accelerated. However, even if the blocks of the rebuild processing are reduced into smaller units, the response speed remains unimproved compared to a case where the rebuild processing is not performed.

The HDD is accessed frequently particularly when the host computer is started, because a boot program of the entire system is stored in the HDD. If the interrupted rebuild processing is resumed automatically, a problem arises that the start-up time of the system is prolonged.

SUMMARY OF THE INVENTION

The present invention is directed to an information processing apparatus and a control method of the information processing apparatus capable of suppressing a delay in start-up time caused by rebuild (or by patrol) when a system is started.

According to an aspect of the present invention, an information processing apparatus connecting a plurality of hard disks, includes a rebuild unit configured to rebuild data stored in one hard disk of the plurality of hard disks to another hard disk of the plurality of hard disks, and a control unit configured to control the information processing apparatus so that, the rebuild unit is prevented from resuming the rebuild immediately after the information processing apparatus is started, and the rebuild is resumed after a predetermined time has elapsed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
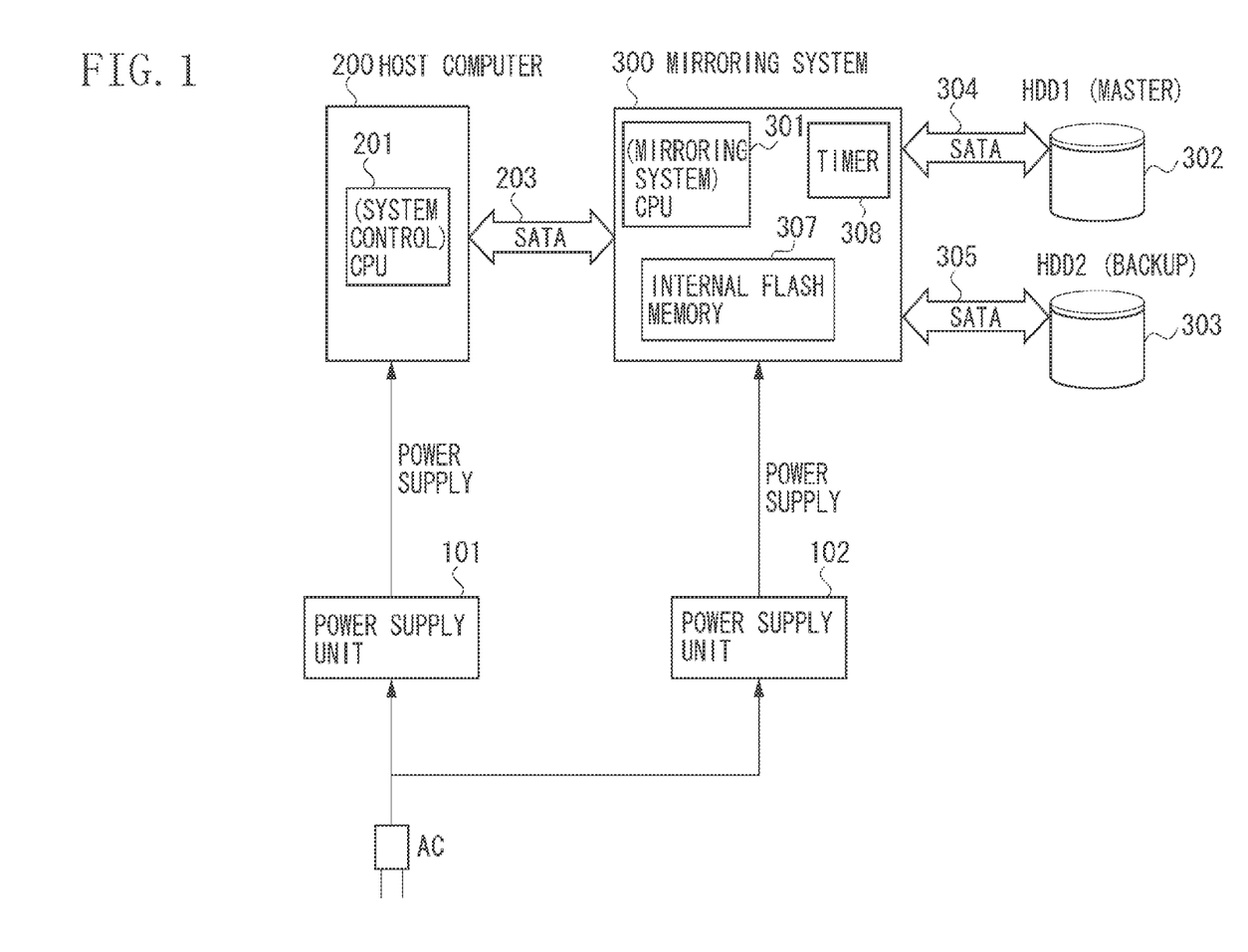
FIG. 1 illustrates a system configuration provided to execute mirroring processing according to an exemplary embodiment of a present invention.

FIG. 1 illustrates a system configuration provided to execute a mirroring processing in the exemplary embodiment of a present invention. In the exemplary embodiment, though a case is described, in which a system in FIG. 1 is applied to a multi-function peripheral (MFP), the present invention can be applied to an information processing apparatus, which includes any other device.

In FIG. 1, a host computer 200 is configured to control the entire MFP. A mirroring system 300 is connected to a host computer 200 via a Serial AT Attachment Interface (SATA) 203, and controls a mirroring processing, which will be described later.

The mirroring system 300 includes a mirroring system CPU 301, a mirroring system internal flash memory (non-volatile memory) 307, and a timer 308. The mirroring system 300 is connected to HDDs 302, 303 as mass-storage devices via SATA signal lines 304, 305, respectively.

A power supply unit 101 supplies power to the host computer 200, and a power supply unit 102 supplies power to the mirroring system 300.

As described above, the host computer 200 and the mirroring system 301 have separate power supplies. When power supply to the host computer 200 is discontinued, power supply to the mirroring system 300 is also turned off. When the host computer is in sleep (power saving) mode, power supply to the mirroring system 300 is turned off. However, when the host computer 200 is supplied with power or when the host computer 200 returns from the sleep mode, power supply to the mirroring system 300 is turned on.

Figure 2:
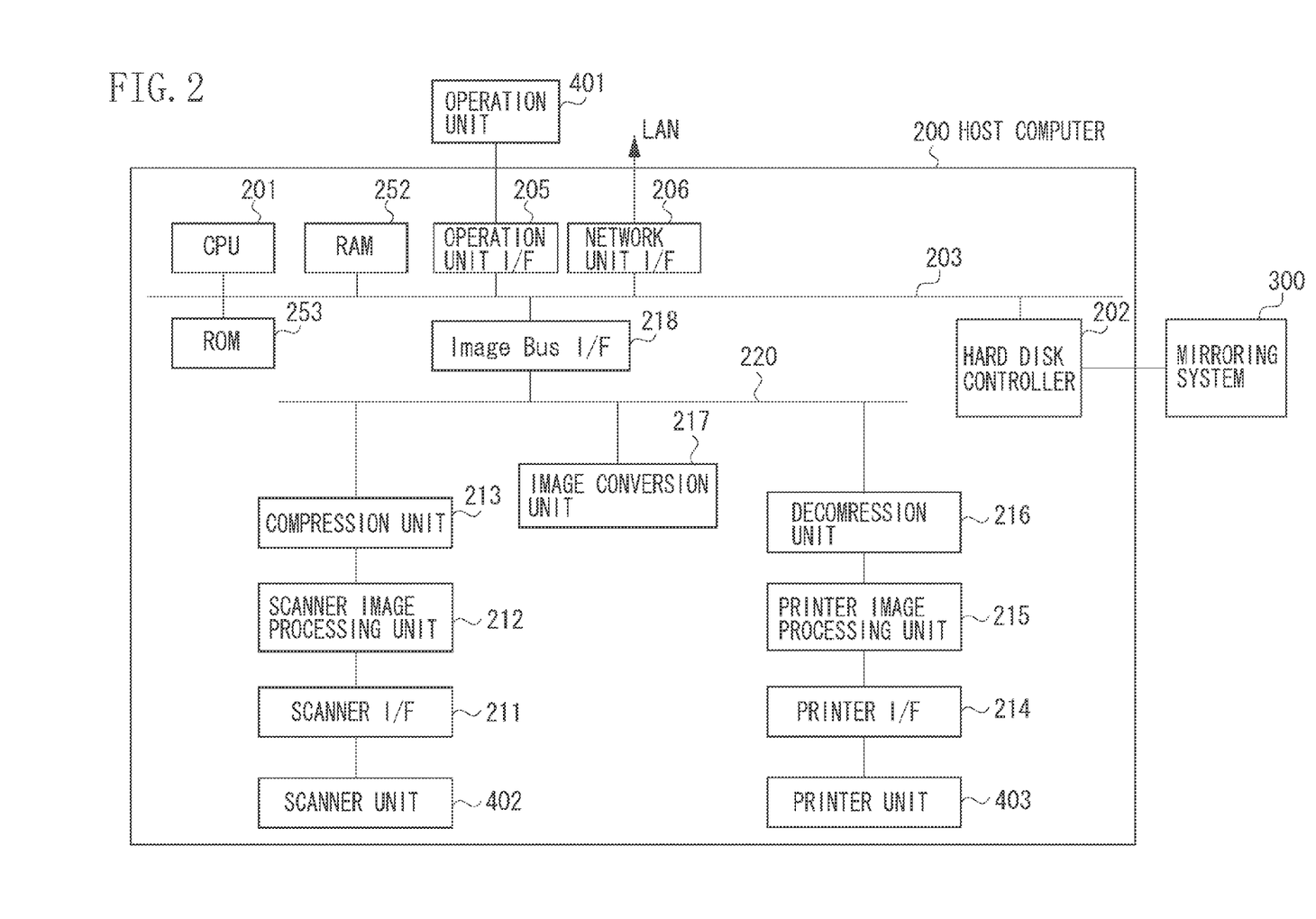
FIG. 2 is a block diagram illustrating a hardware configuration of a multi-function peripheral (MFP) according to the exemplary embodiment.

FIG. 2 is a block diagram illustrating a hardware configuration of a multi-function peripheral (MFP) according to the exemplary embodiment of the present invention. An internal configuration of the host computer 200 illustrated in FIG. 1 will be described in detail.

The host computer 200 includes a controller function to control the entire MFP. The host computer 200 is electrically connected to an operation unit 401, a scanner unit 402, and a printer unit 403, and is also connected to a LAN via a network interface 206 as a network interface to communicate image data or device information with personal computers or external devices.

The CPU 201 (the system control CPU in FIG. 1) collectively controls access to various connected devices according to a control program stored in a ROM 253, and centrally controls various items of processing performed by the internal controller function.

The RAM 252 is a system work memory used by the CPU 201 for its operation, and also serves as a memory for temporarily storing image data. This RAM 252 is formed by an SRAM (non-volatile memory) to retain stored data after power supply is turned off, and a DRAM (volatile memory) in which stored data is erased after power is turned off. The ROM 253 stores a boot program of the apparatus.

A hard disk controller 202 is connected to the mirroring system 300. Hard disks 302, 303 illustrated in FIG. 1 and connected to the mirroring system 300 are configured to store system software and image data.

An operation unit interface 205 connects the system bus 203 and the operation unit 401. The operation unit interface 205 receives image data from the system bus 203 and outputs it to the operation unit 401 to display, and also outputs information sent from the operation unit 401 onto the system bus 203.

An image bus 220, which is a transmission channel to exchange image data, is formed by a Peripheral Component Interconnect (PCI) bus. An Image Bus Interface 218 is a bus bridge to connect the system bus 203 and the image bus 220, and converts data structure.

A scanner image processing unit 212 corrects, processes, and edits image data received from a scanner unit 402 via a scanner interface 211. The scanner image processing unit 212 determines whether received image data is of a color document or a monochrome document, and of a character document or a photo document.

A result of determination is attached to image data. Attached information is called image area data. A compression unit 213 receives image data, and divides it into blocks each including 32×32 pixels, and the image data having blocks is called tile data.

An MFP in the exemplary embodiment executes a copy processing as follows.

Image data read by the scanner unit 402 is sent to the scanner image processing unit 212 via the scanner interface 211.

After generating tile data, including 32-pixel by 32-pixel blocks, the compression unit 213 compresses the tile data. The compressed image data (tile data) is sent to the RAM 252 and stored. If need arises, this image data is sent to an image conversion unit 217 and subjected to image processing, and sent back to the RAM 252 and stored.

Data read from the RAM 252 is written into a mirroring system 300. The mirroring system 300 writes received data in the connected HDDs 302 and 303. Then, data read from the HDD 302 connected to the mirroring system 300 is sent onto the bus 203

Then, the image data is sent from the bus 203 to a decompression unit 216. The decompression unit 216 decompresses this image data. The decompression unit 216 rasterizes the decompressed image data including a plurality of tile data. Rastrized image data is sent to a printer image processing unit 215.

Image data processed in the printer image processing unit 215 is sent to the printer 403 via the printer interface 214, and printed in the printer 403. The flow of data during copy processing in the MFP has been described. The image data is passed through the HDDs of the mirroring system 300 because it is assumed that a need will arise to secure a work area where page replacement is performed, for example.

The mirroring system 300 transmits an ATA command given from the host computer 200 to the connected HDD. When two HDDs are connected as illustrated in FIG. 1, the command is transmitted to both HDDs.

A write command from the host computer 200 to the HDDs is sent to the mirroring system 300 via the HDD controller 202. The mirroring system 300 issues a write command to all connected HDDs.

A read command (read request) from the host computer 200 to the HDD is sent to the mirroring system 300 via the HDD controller 202. Different from a case of a write command, the mirroring system 300 issues a read command only to one of a plurality of connected HDDs, normally, to the master one of the HDDs.

Figure 3:
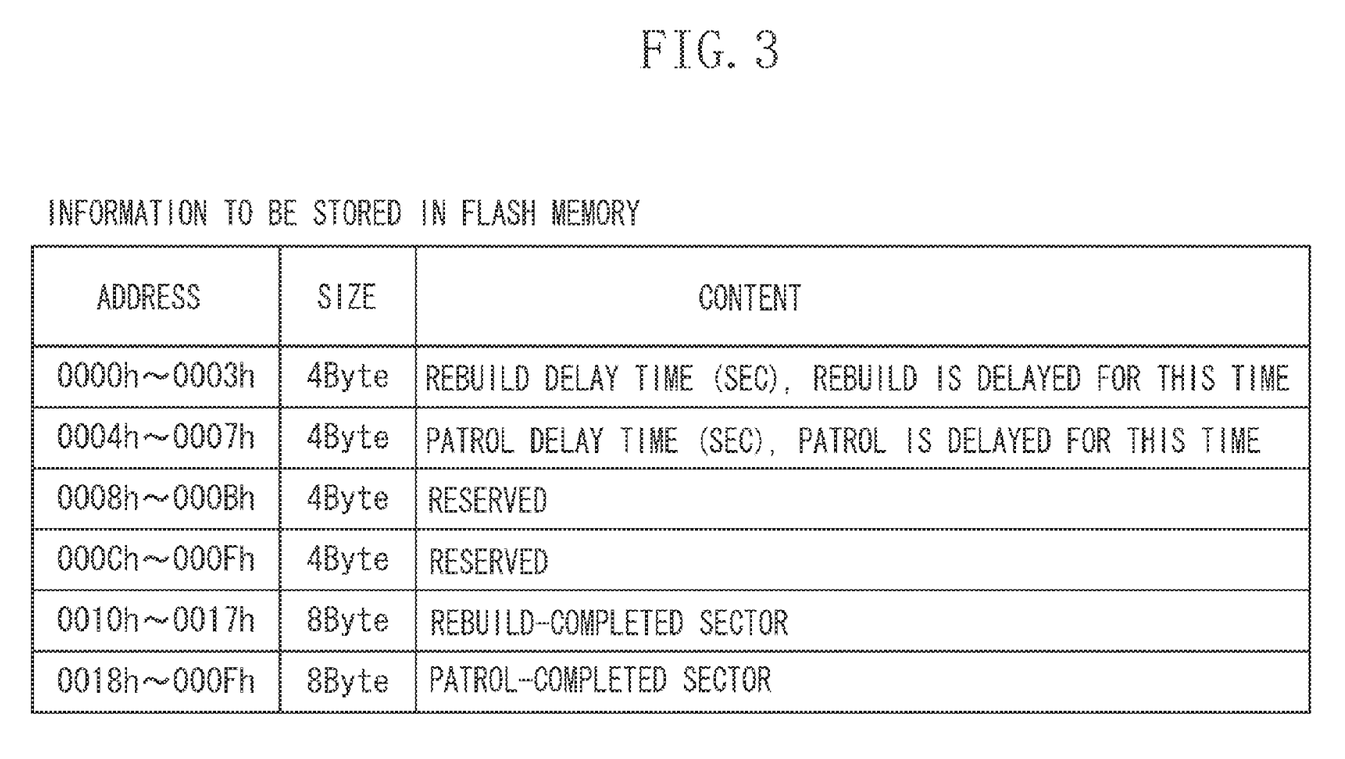
FIG. 3 illustrates information to be stored in FLASH memory in a mirroring system according to the exemplary embodiment.

FIG. 3 illustrates an example of information to be stored in the internal flash memory 307 of the mirroring system 300. A "rebuild delay time" is a value set by a SET REBUILD command, which will be described later. Even after the mirroring system has been started, until a designated number of seconds pass, the rebuild is not resumed. If the user does not set this value, a default value is set. The rebuild delay time is set in seconds.

A "patrol delay time" is a value set by a SET PATROL command, which will be described later. After the mirroring system has been started, until a designated number of seconds pass, the patrol is not resumed. If the user does not set this value, a default value is set. The patrol delay time is set in seconds.

A "rebuild completed sector" is information indicating how far a rebuild has been completed. In other words, this information indicates, out of a plurality of sectors in the HDD, to which sector the rebuild has been completed. When turning off the power supply, the mirroring system 300 interrupts the rebuild, and records an interrupted sector in the flash memory.

When the rebuild has been completed, 0 is entered at the relevant sector. Therefore, when the value of the rebuild completed sector is not 0, it is known that the rebuild is in progress or interrupted. When starting the mirroring system, the mirroring system 300 refers to the value of the rebuild completed sector, if the value is not 0, resumes the rebuild from the sector where the rebuild has been interrupted.

A "patrol completed sector" is information indicating where the patrol has advanced. In other words, this information indicates, out of a plurality of sectors in the HDD, up to which sector the patrol has been completed. When turning off the power supply, the mirroring system 300 interrupts the patrol, and records the sector where the patrol was interrupted.

When a sector is not being patrolled, 0 is entered. Therefore, if the value of the patrol completed sector is not 0, it is known that the patrol is being performed or interrupted. When turning off the power supply, the mirroring system 300 refers to the value of the patrol completed sector, if this value is not 0, resumes the patrol from the patrol-interrupted sector.

Figure 4:
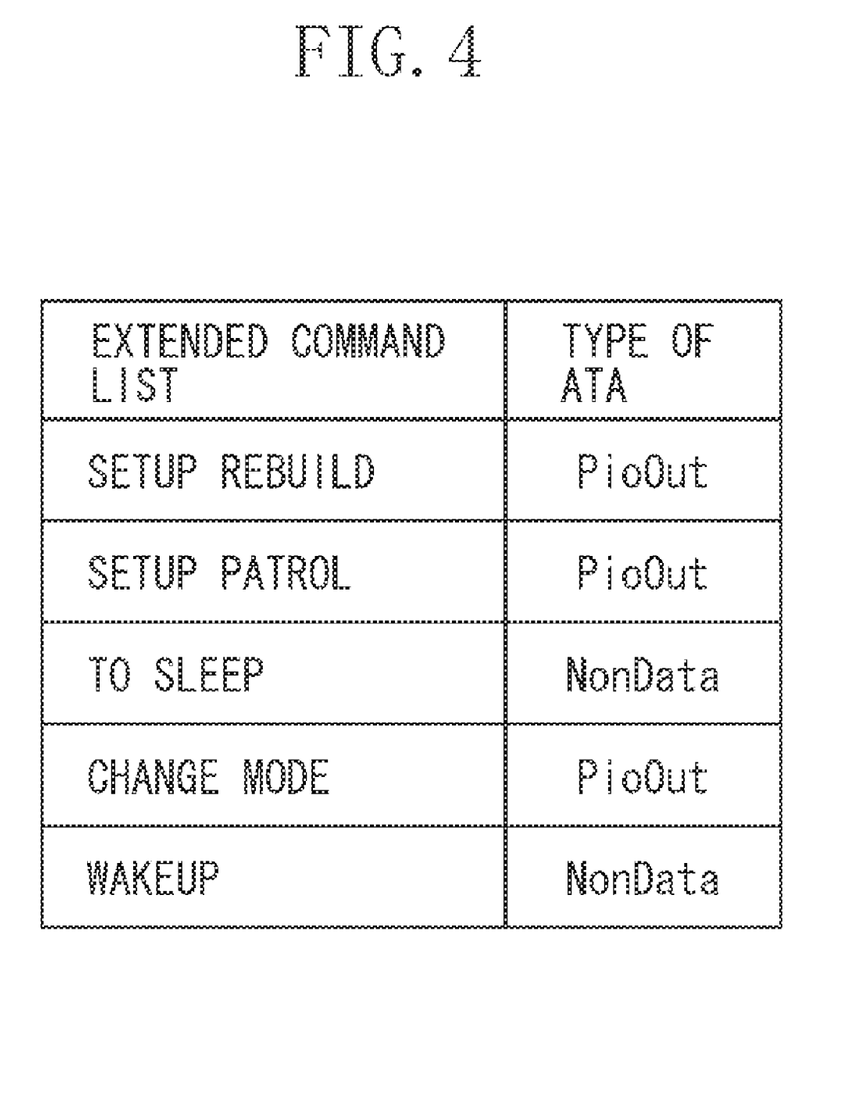
FIG. 4 is a tabulated list of extended commands of Serial AT Attachment Interface (SATA) according to the exemplary embodiment.

FIG. 4 is a table listing SATA extended commands. As described above, the mirroring system 300 can receive commands from the host computer via the SATA signal line. The mirroring system 300 in the present exemplary embodiment can receive extended commands in addition to ordinary SATA commands. FIG. 4 is a list of SATA extended commands used in the mirroring system in the present exemplary embodiment.

The SATA commands are divided into "PIOOUT commands", "PIOIN commands", and "NONDATA" commands. The "PIOOUT" commands are commands to transfer data from the host computer to the mirroring system. The "PIOIN" commands are commands to transfer data from the mirroring system to the host computer. The "NONDATA" commands are commands not followed by data transfer.

The extended commands sent from the host computer are interpreted only in the mirroring system 300, and are not sent to the HDDs 302, 303 via the SATA signal lines.

The extended commands classified as the "PIOOUT" commands include "SETUP REBUILD", "SETUP PATROL", AND "CHANGE MODE" commands.

The "SETUP REBUILD" command is a command to set up a rebuild function. The "SETUP PATROL" command is a command to set up a patrol function. The "CHANGE MODE command" is a command to direct a changeover from the host computer to the mirroring system and from a single mode to a mirroring mode.

When receiving this command, the mirroring system automatically starts a rebuild. The single mode is an operation mode in which only one HDD is used, and the single mode includes cases (1) only one HDD is connected to the mirroring system, and (2) one HDD is used out of a plurality of HDDs connected to the mirroring system. On the other hand, the mirroring mode is a mode in which a mirroring processing is executed.

The extended commands classified into the "NONDATA" command category include the "TOSLEEP" and "WAKEUP" commands.

The "TOSLEEP" command is a command to instruct that the power supply to the mirroring system should be turned off. This command is issued to the mirroring system when the host computer disconnects the power supply or enters the sleep mode. The mirroring system, on receiving a "TOSLEEP" command, interrupts the rebuild or the patrol currently in progress, and records an interrupted sector in the flash memory. After this, the power supply to the mirroring system is turned off.

The "WAKEUP" command is a command to notify the mirroring system of the host computer's return from the sleep mode. In the present exemplary embodiment, the power supply to the mirroring system is turned off either when the host computer turns off its power supply or when the host computer enters the sleep mode. Also, the power supply to the mirroring system is turned on either when the power supply to the host computer is turned on or the host computer returns from sleep.

At the time of its startup, the mirroring system has no means to know whether the host computer has returned from the sleep mode or whether the power supply to the host computer has been turned on. When the host computer has returned from the sleep mode, this extended command "WAKEUP" is notified to the mirroring system. By this command, the mirroring system can know that the power supply to the mirroring system has been turned on because the host computer has been returned from sleep.

In other words, the mirroring system can make a discrimination of whether the power is applied to the mirroring system because the power supply to the host computer has been turned on or because the host computer has returned from the sleep mode.

Figure 5:
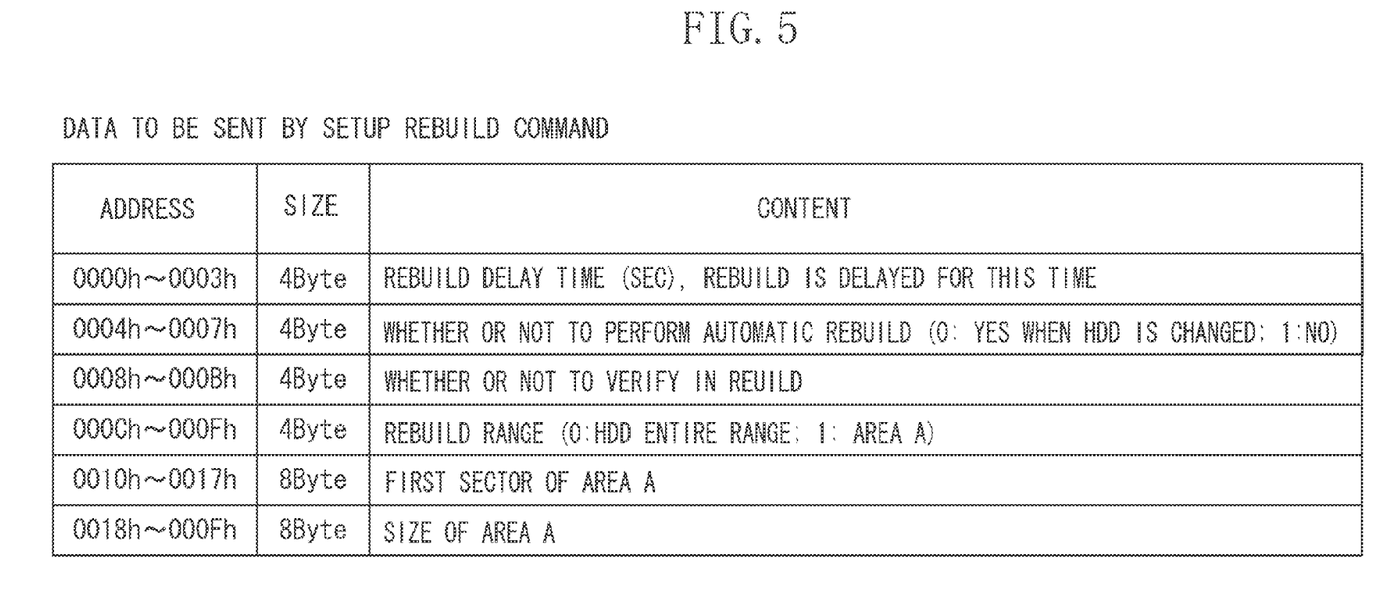
FIG. 5 illustrates data to be sent from a host computer to the mirroring system according to the exemplary embodiment.

FIG. 5 illustrates data sent from the host computer to the mirroring system when a "SETUP REBUILD" command as a "PIOOUT" command in FIG. 4 is executed. This data is generated by the host computer.

The "rebuild delay time" indicates a wait time until a rebuild is executed after the mirroring system has been started. The mirroring system does not resume the rebuild until a designated number of seconds pass.

The "whether or not to perform a rebuild" is information to indicate whether a rebuild is performed automatically when an error-detected hard disk is replaced. The "whether or not to verify data in a rebuild" is information to indicate whether data is verified when the mirroring system performs a rebuild.

Figure 6:
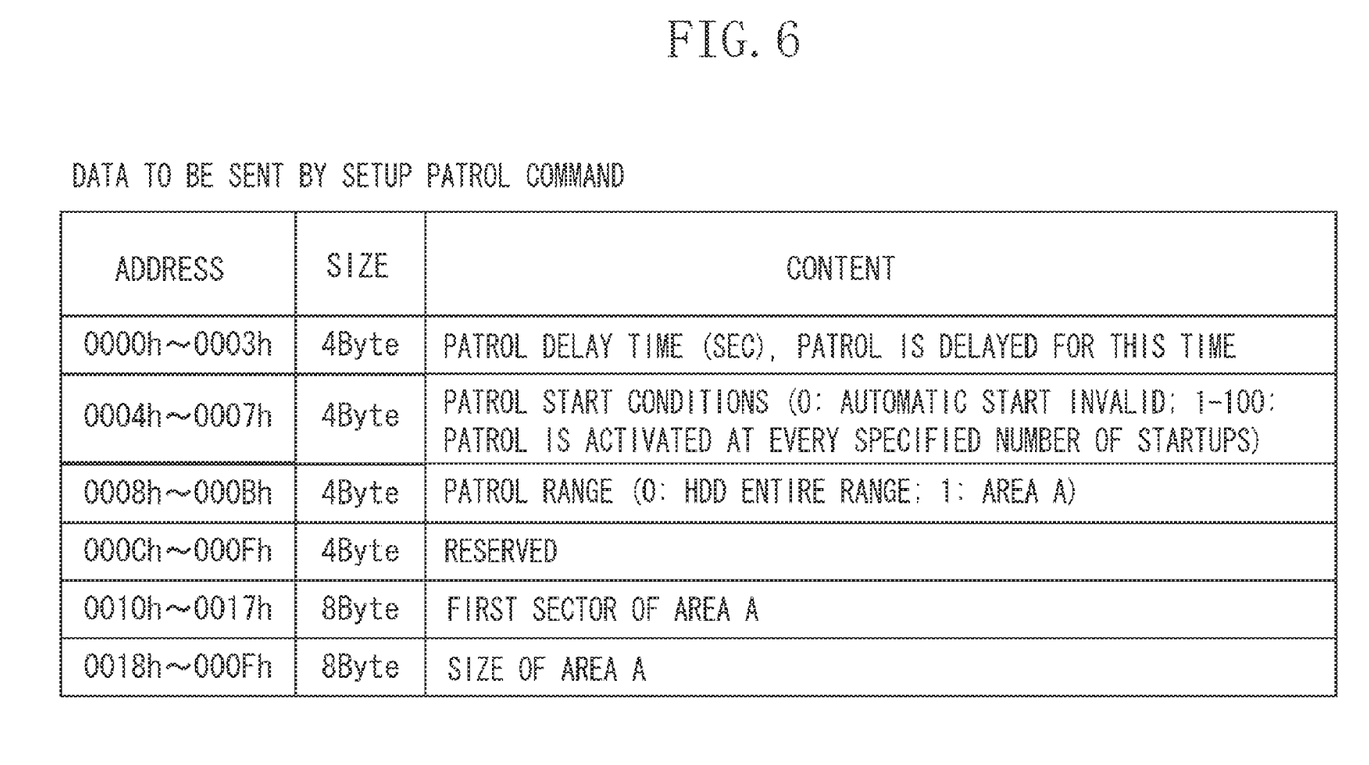
FIG. 6 illustrates data to be sent from the host compute to the mirroring system according to the exemplary embodiment.

The "rebuild execution range" is information to specify whether the entire hard disk is rebuilt or only a specific range (sectors) is rebuilt when the mirroring system performs a rebuild. The "first sector and the size of area A" is information about a range set as a rebuild execution range FIG. 6 is a table of data sent from the host computer to the mirroring system when a "SETUP PATROL" command as a "PIOOUT" command in FIG. 4 is executed. This data is generated by the host computer.

The "patrol delay time" indicates a wait time until patrol is performed after the mirroring system has been started. The mirroring system does not resume the rebuild until a designated number of seconds pass. The "start conditions" are information to indicate conditions for the mirroring system to start patrol.

The "patrol execution range" is information about whether to patrol the entire hard disk or only a specified range (sectors) when the mirroring system performs patrol. The "first sector and the size of area A" is information about a range set as a patrol execution range FIG. 7 indicates data to be sent from the host computer to the mirroring system when a "CHANGE MODE" command as a "PIOOUT" command illustrated in FIG. 4 is executed. This data is generated by the host computer.

Figure 7:
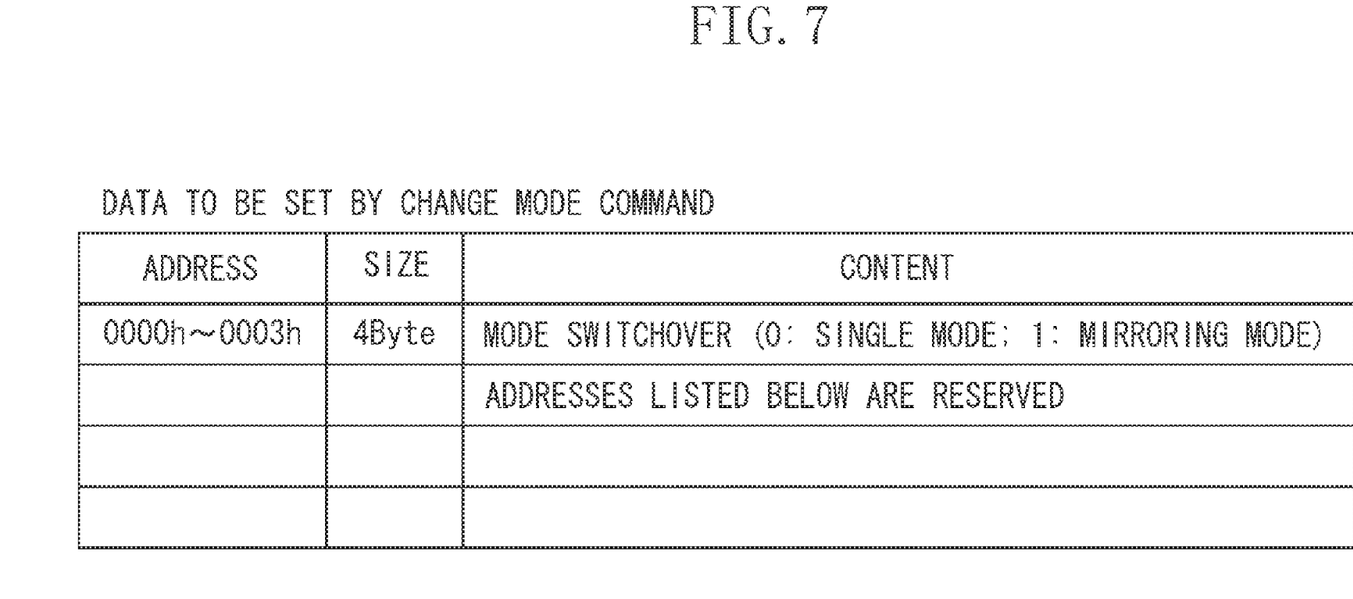
FIG. 7 illustrates data to be sent from the host computer to the mirroring system according to the exemplary embodiment.

The "CHANGE MODE" command is used to switch over between the single mode and the mirroring mode.

In the mirroring system in the present exemplary embodiment, a rebuild (or patrol) is performed by exchange of commands and data illustrated in FIGS. 4 to 7. During a rebuild, data is read from the master HDD (HDD containing valid data) and written to a backup HDD (added HDD).

Generally, a rebuild is a time-consuming work because a very large amount of data is rebuilt. While a rebuild is in progress, mirroring is not implemented, and user data is not protected by redundantly storing information on a spare disk. Therefore, it is desirable to complete a rebuild as quickly as possible.

If the data size to be copied at a time (the number of blocks to be rebuilt) is increased, time up to the end of the rebuild is shortened. However, if a HDD read/write command is sent from the host computer while data is being copied, a response to the request cannot be made until data has been copied. This delayed response to a read/write request from the host computer is a disadvantage.

On the other hand, if the data size to be copied at a time is decreased, since data copying can be finished quickly (because of the small block units), the response to HDD read/write requests from the host computer is good. However, there is a disadvantage that time until the rebuild is completed is long.

No matter how small the data size of data to be copied at a time may be, overhead is generated, attending on issuance of commands to read data from the master HDD and write data onto the backup HDD. Therefore, total data access time from the host computer is prolonged. If one wishes to minimize the total data access time, it is necessary not to perform a rebuild itself.

The above problem can be said of patrol. The size of data to be read from the two HDDs can be adjusted indeed, but as patrol is performed, overhead is generated in issuance of commands to read and write data on the HDDs.

Figure 8:
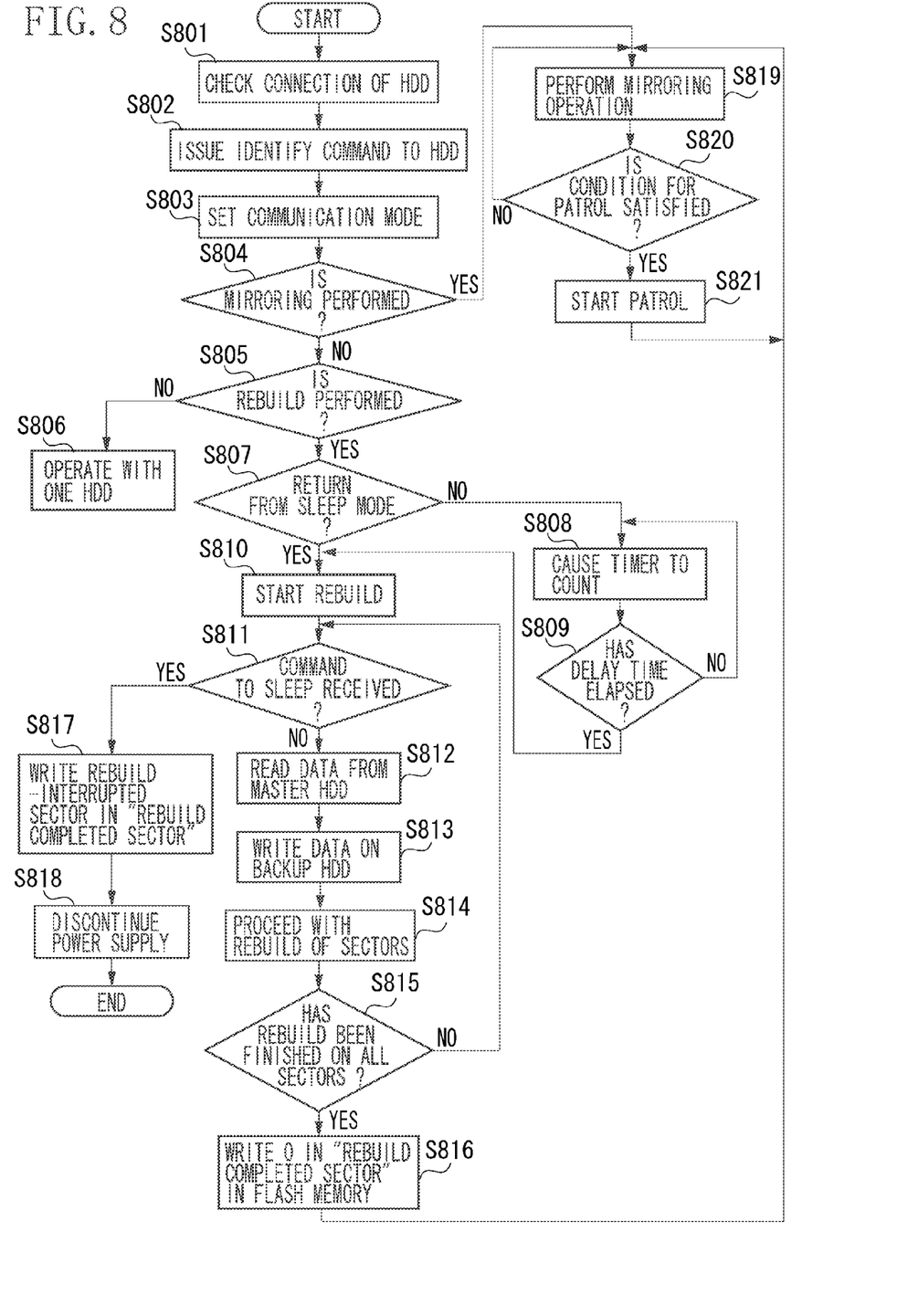
FIG. 8 is a flowchart illustrating processing to be executed in the mirroring system according to the exemplary embodiment.

FIG. 8 is a flowchart illustrating processing executed on the mirroring system 300 in the present exemplary embodiment. The steps of processing in FIG. 8 are executed by the mirroring system CPU 301 performing a computer program.

In step S801, the CPU 301 confirms that the HDDs are connected. Instep S802, the CPU 301 issues an identify command to each HDD, and conforms the condition of each connected HDD. In step S803, the CPU 301 sets a transfer mode between the connection-confirmed HDD and the mirroring system.

In step S804, the CPU 301 determines whether mirroring should be performed. First, the CPU 301 determines whether the connections of the two HDDs are confirmed. When the two HDDs are confirmed as connected to the mirroring system, the CPU 301 determines whether consistency of data between the HDDs is achieved.

More specifically, the CPU 301 refers to information in the rebuild completed sector held in the internal flash memory 307 to determine whether the value is 0. If the value is 0, it is determined that the rebuild is completed, and it is also determined that consistency of data stored in the two HDDs is achieved.

Therefore, in step S804, the CPU 301 determines two conditions of whether two HDDs are connected and whether the consistency of data in the two HDDs is achieved. If the two conditions are satisfied (YES in step S804), the processing proceeds to step S819. On the other hand, if at least one of the two conditions is not satisfied (NO in step S804), the processing proceeds to step S805.

Instep S805, the CPU 301 determines whether a rebuild should be performed. In step S805, the number of the HDDs connected to the mirroring system 300 is confirmed, and if one HDD is connected, it is determined that a rebuild is not performed (NO in step S805), and the processing proceeds to step S 806.

If the two HDDs are connected, the CPU 301 determines whether the single mode is currently set, and if the single mode is set, it is determined that a rebuild is not performed (NO in step S805), and the processing proceeds to step S806. On the other hand, if the two HDDs are connected and the value in the rebuild completed sector is other than 0, it is determined that a rebuild is performed (YES in step S805), the processing proceeds to step S807. In step S806, an ordinary operation is performed using one HDD.

As described above, if the value in the rebuild completed sector is other than 0, there is a rebuild interruption at this sector. More specifically, previously, the power supply to the mirroring system 300 was turned off by a "TOSLEEP" command issued from the host computer while the rebuild was being performed before the rebuild was completed. Therefore, the mirroring system, which has been started, needs to resume the rebuild from the sector where the rebuild was interrupted.

Instep S807, the CPU 301 determines whether the power supply to the host computer 200 has been turned on from its power-off state or whether the host computer has returned from the sleep mode. More specifically, the CPU 301 determines whether the mirroring system 300 has received a "WAKEUP" command from the host computer 200. This is because the host computer 200, only when returning from sleep, issues a "WAKEUP" command to the mirroring system 300.

In step S807, when determining that the "WAKEUP" command has been received, the CPU 301 determines that the host computer 200 has returned from sleep (YES in step S807), and the processing proceeds to step S810. On the other hand, when determining that no "WAKEUP" command has been received, the CPU 301 determines that the power supply to the host computer 200 has been turned on from its power-off state, and the processing proceeds to step S808.

In step S808, the CPU 301 causes the timer 308 to start counting. In step S809, the CPU 301 refers to the "rebuild delay time" stored in the internal flash memory 307, and determines whether the count of the timer 308 has reached the rebuild delay time. If the count of the timer 308 has reached the rebuild delay time (YES in step S809, the CPU 301 proceeds to step S810.

In step S810, the CPU 301 start a rebuild.

When the power supply to the host computer is turned on from its power-off state, it is necessary to wait for a delay time before the mirroring system 300 starts a rebuild. The reason is that after the power supply to the host computer 200 is turned on, the mirroring system 300 receives frequent accesses from the host computer 200 to read and write files.

If a rebuild is performed under this situation, the response to requests from the host computer 200 to read and write the HDDs is slowed down. In the present exemplary embodiment, to prevent this problem, when the host computer 200 is supplied with power from its power-off state, after a lapse of a delay time, the mirroring system 300 starts a rebuild.

On the other hand, when the host computer 200 returns from sleep, information to be read from the HDD by the host computer has already been stored in the memory of the host computer 200. In other words, the mirroring system 300 does not receive frequent accesses from the host computer to read and write files on the HDDs.

Therefore, in the present embodiment, when the host computer 200 returns from sleep, the mirroring system 300 immediately starts a rebuild without waiting for a delay time to pass.

In step S811, the CPU 301 determines whether the mirroring system has received a "TOSLEEP" command from the host computer 200. If the CPU 301 has received "TOSLEEP" command, the processing proceeds to step S817. If the CPU 301 has not received "TOSLEEP" command, the processing proceeds to step S812.

In step S812, the CPU 301 reads data from the master HDD out of the two connected HDDs and, in step S813, writes data to the other (backup) HDD. Then, in step S314, the CPU 301 advances control from one sector to another for as many as the sectors of the backup HDD, on which data has been copied from the master HDD.

In step S815, the CPU 301 determines whether the rebuild of all the sectors has been completed. If the rebuild has been completed (YES in step S815), the processing proceeds to step S816. On the other hand, if the rebuild has not been completed (NO in step S815), the processing returns to step S811. In step 816, the CPU 301 writes Os in the rebuild completed sector in the internal flash memory 307. In other words, the CPU 301 writes information that the rebuild has been completed normally, and the processing proceeds to step S819, and from this step on, the CPU 301 performs mirroring.

If it is determined in step S811 that a "TOSLEEP" command has been received from the host computer 200 (YES in step S811), the processing proceeds to step S817. In step S817, the CPU 301 writes information that the rebuild has been interrupted in the rebuild completed sector, which is stored in the internal flash memory 307. The CPU 301 writes the sector, on which the rebuild has been performed, into the rebuild completed sector. In step S818, the CPU 301 turns off the power supply.

In step S819, the CPU 301 performs a mirroring operation. When the mirroring operation is being performed, in step S820, the CPU 301 determines whether or not to perform patrol. Generally, the user designates an interval of patrol, such as once a month. In step S820, the CPU 301 checks a condition for performing patrol, i.e., whether current time and date has reached a predetermined time and date.

If patrol need not be performed (NO in step S820), the processing returns to step S819, and the mirroring operation is continued. If patrol needs to be performed (YES in step S820), in step S821, the CPU 301 performs a patrol operation, and when the patrol is completed (NO in step S820), the processing returns to step S819, and the mirroring operation is continued.

Though the patrol operation executed in step S821 is not described in detail, when a patrol processing is performed, like in a rebuild, a determination similar to that performed in step S807 is performed. When the host computer 200 returns from sleep, as in a rebuild, the similar processing as that performed in steps S808 and S809 is carried out. In other words, when the host computer 200 returns from sleep, the patrol processing is delayed for a period corresponding to a delay time.

As described above, in the present exemplary embodiment, a rebuild is prevented from being resumed immediately when the rebuild processing in the mirroring system was interrupted by turning off the power supply to the host computer and the host computer has been started by turning on its power supply.

This is intended to prevent a delay in HDD access from the host computer caused by a contention with the rebuild processing because access to the HDDs is requested frequently when the host computer is started. In the present exemplary embodiment, the rebuild is not resumed immediately, but after a lapse of a predetermined delay time, the rebuild is started. Therefore, a contention with many HDD accesses requested by the host computer can be prevented.

The "rebuild delay time" retained in the flash memory 307 in the mirroring system may be changed arbitrarily by the user (administrator, for example). A startup time of the host computer may be calculated and the calculated startup time may be written automatically in the rebuild delay time. Or, instead of providing the rebuild delay time, the mirroring system may be arranged to starts a rebuild after receiving a notification that the startup has been completed from the host computer.

In the above-described embodiment, although a case where two hard disks are connected to the mirroring system has been discussed, the present exemplary embodiment can be applied to a case where three or more hard disks are connected.

In the above-described embodiment, although the host computer and the mirroring system are included in one apparatus (MFP, for example), they can be provided as separate apparatuses. For example, the present exemplary embodiment can be applied to a case where the host computer and the mirroring system are connected via a network, such as a LAN.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-172069 filed Jul. 23, 2009, which is hereby incorporated by reference herein in its entirety.

What is claimed is:

1. A mirroring system connectable to a host computer and connectable to a plurality of hard disks, the mirroring system comprising:

a rebuild unit configured to rebuild data stored in one hard disk of the plurality of hard disks to another hard disk of the plurality of hard disks; and a control unit configured, when a rebuilding process by the rebuild unit is interrupted when the mirroring system is started, to cause the rebuild unit to resume the rebuilding process, wherein the control unit is configured to cause the rebuild unit to resume the rebuilding process when a predetermined amount of time passes after the mirroring system is started, in a case where the mirroring system is started by a first resuming factor, and wherein the control unit is configured to cause the rebuild unit to resume the rebuilding process before the predetermined amount of time passes after the mirroring system is started, when the mirroring system is started by a second resuming factor.

2. A control method for a mirroring system connectable to a host computer and connectable to a plurality of hard disks, the control method comprising:
rebuilding data stored on one hard disk of the plurality of hard disks to another hard disk of the plurality of hard disks; and
controlling, in a case where a rebuilding process is interrupted when the mirroring system is started, the rebuilding process to be resumed,
wherein the rebuilding process is resumed when a predetermined amount of time passes after the mirroring system is started, in a case where the mirroring system is started by a first resuming factor, and
wherein the rebuilding process is resumed before the predetermined amount of time passes after the mirroring system is started, in a case where the mirroring system is started by a second resuming factor.

3. The mirroring system according to claim 1, further comprising a determination unit configured to determine whether a rebuilding process is interrupted when the mirroring system is started;
wherein the control unit is configured, when the determination unit determines that the rebuilding process is interrupted, to cause the rebuild unit to resume the rebuilding process.

4. The mirroring system according to claim 3, further comprising:
a receiving unit configured to receive information indicating that the host computer has returned from the power saving mode,
wherein the control unit is configured to cause the rebuild unit to resume the rebuilding process when the predetermined amount of time passes after the mirroring system is started, in a case where the receiving unit has not received the information, and
wherein the control unit is configured to cause the rebuild unit to resume the rebuilding process before the predetermined amount of time passes after the mirroring system is started, when the receiving unit has received the information.

5. The mirroring system according to claim 3, further comprising a retaining unit configured to retain information indicating that the rebuild has been interrupted when the rebuild by the rebuild unit was interrupted,
wherein the determination unit determines whether the rebuild is interrupted according to whether the information that the rebuild has been interrupted is retained in the retaining unit.

6. A non-transitory computer-recordable storage medium storing computer-executable instructions to cause a computer to execute the control method according to claim 2.

7. An information processing apparatus comprising the mirroring system according to claim 1 and a host computer.

8. The mirroring system according to claim 1,
wherein the first resuming factor is starting of the host computer which requires access to the hard disk, and
wherein the second resuming factor is starting of the host computer which does not require access to the hard disk.

9. The mirroring system according to claim 1,
wherein the first resuming factor is returning of the host computer from a power-off state, and
wherein the second resuming factor is returning of the host computer from a power saving state.

* * * * *